United States Patent [19]

Nara et al.

[11] Patent Number: 4,614,952
[45] Date of Patent: Sep. 30, 1986

[54] PEN TYPE MULTI-COLOR RECORDING DEVICE

[75] Inventors: Hajime Nara; Kimihiro Kosugi; Kazunori Uryo, all of Hino, Japan

[73] Assignee: Orient Watch Co., Ltd., Tokyo, Japan

[21] Appl. No.: 650,406

[22] Filed: Sep. 13, 1984

[30] Foreign Application Priority Data

Sep. 14, 1983 [JP] Japan ................... 58-170949
Sep. 14, 1983 [JP] Japan ................... 58-170950

[51] Int. Cl.⁴ .................. G01D 9/28; G01D 15/16
[52] U.S. Cl. ................... 346/139 R; 346/49
[58] Field of Search .............. 346/136, 139 R, 49, 346/140 R, 141

[56] References Cited

U.S. PATENT DOCUMENTS

| 4,405,931 | 9/1983 | Fujisawa | 346/139 R |
| 4,455,559 | 6/1984 | Fujisawa | 346/139 R |
| 4,533,922 | 8/1985 | Tanaka | 346/49 |
| 4,533,924 | 8/1985 | Takahashi | 346/49 |

*Primary Examiner*—E. A. Goldberg
*Assistant Examiner*—M. Reinhart
*Attorney, Agent, or Firm*—Burgess, Ryan & Wayne

[57] ABSTRACT

A multi-pen type plotter printer is disclosed in which a desired character or graphic pattern is produced on the monitor paper by a selected one out of plural pens arranged in the carriage in accordance with an information signal, comprising a hammer slidably and pivotally disposed on the carriage for actuating the selected pen into contact with the surface of the paper for plotting while the carriage and the platen are moved. A blade member is pivotally disposed which has a dimension wider than the width of the effective plotting range and is rotated in either direction to rotate the pusher in the same direction so as to cause the pusher to move toward and away from the pen.

4 Claims, 17 Drawing Figures

PEN TYPE MULTI-COLOR RECORDING DEVICE

BACKGROUND OF THE INVENTION

The present invention relates in general to multi-pen type plotter printer and, in more particular, to a multipen type plotter printer having a special mechanism for selection between plural pens.

In the prior art are well known multi-plotter printer, having plural pens, normally mounted on the carriage, for plotting a character or graphic pattern in differently colored ink in response to an information signal. In them, the individual pens are selected for their color of ink and brought into contact at their tip with the surface of monitor paper in which the plotting takes place.

For example, Japanese Patent Application Disclosure No. 68299/1984 discloses a multi-pen plotter printer in which the pens are arranged on the carriage in a row parallel with the direction of travel of the carriage. A signal push member that is also provided on the carriage moves to the rear end of the particular selected pen and pushes it against the monitor paper. This device is advantageous in that the pens need not be provided with a respective push member so that it can be built into a simple construction with the reduced number of parts. However, the device have been found to pose certain problems. First, the carriage cannot be made compact and lightweight, since the entire set of the pen driving system needs to be mounted on it. Secondly, the intrinsic mechanism of the device renders it unsuitable for fast representation of information on the monitor paper and awkward in its pen selecting motion, since, each time a particular pen is selected, full length movement of the carriage along the platen is required to move the push member along with its integrally associated selector shaft into the proper position behind the pen between fixing block members.

SUMMARY OF THE INVENTION

The present invention has its object to provide a multi-pen plotter printer of compact construction which is suitable for fast plotting as well as reliable in operation.

This invention is therefore directed to a unique multipen plotter printer which comprises a plurality of pens arranged on a scanning recorder means, a pusher means slidably and pivotably mounted on the scanning recorder means such as to be able to select an appropriate one from these plural pens and bring it into contact with the surface of the monitor paper for a subsequent plotting operation, and an actuating means having an axial length exceeding the width of the effective plotting range for operating the pusher means between both ends of the scanning range, and a drive means for driving the actuating means for release and actuation of the pen, respectively.

DESCRIPTION OF THE PREFERRED EMBODIMENTS

Figure 1:
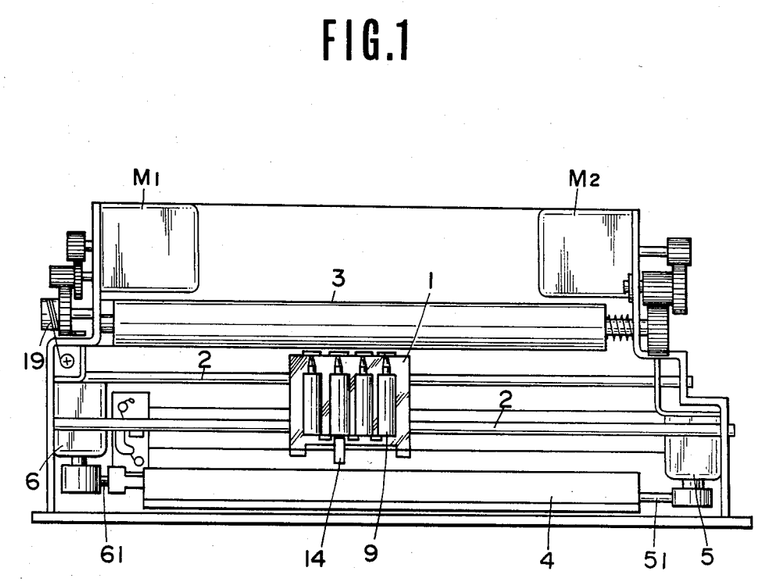
FIG. 1 is a plan view of a typical embodiment of the multi-pen plotter printer constructed in accordance with the present invention.
Figure 2:
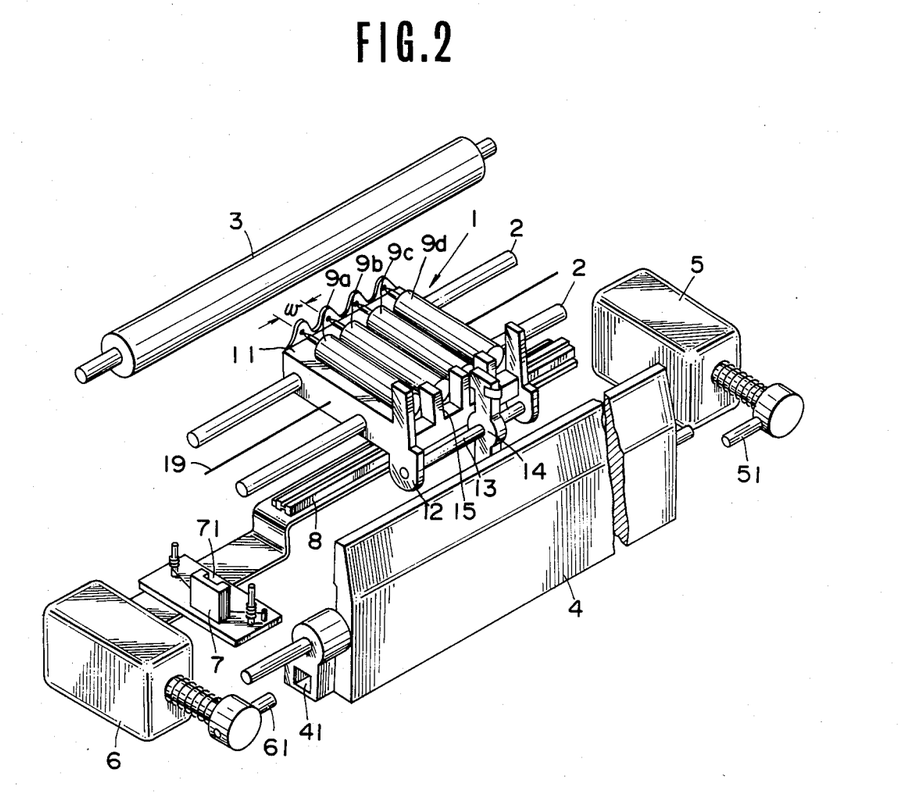
FIG. 2 is an exploded, perspective view showing the important section of the invention.

FIGS. 1 and 2 show the overall construction of the typical embodiment of the plotter printer according to the present invention. In the drawings, a carriage 1 is slidably disposed on a fixed pair of parallel guide rods 2, 2 for back and forth movement along the platen 3 in the main scanning direction. In operation, the carriage 1 is moved through a wire member 19 by a step motor M1 which is in turn driven in response to a pulse signal. The carriage 1 is provided on the upper surface 11 thereof with a plurality of pens 9, which are arranged in a single row substantially parallel with the axis of the paired guide rods 2, 2 and which are each adapted for plotting in ink of a different color. In this particular embodiment, these pens are, for example, black-, red-, blue- and green-ink pens, 9a, 9b, 9c, 9d, respectively. Preferably, the black-ink pen 9a is situated at the outermost end of the carriage on its home position side and therefore is called the reference point pen for the purpose which will be described later. [The home position is the position that is determined by the left margine set on the printer.] Moreover, each of the pens 9 is slidably disposed on the carriage 1 for movement between a first position where their tip thrusts out for contact with the surface of the monitor paper on the platen 3 and a second position where the pen body is retracted away from the platen 3. [Preferably, each pen is normally urged into the second position.] Also, the carriage 1 is provided at the backside thereof with a bracket 12, on which is fixedly supported a guide rod 13 that extends parallel with the axis of the paired guide rods 2, 2. A hammer 14 is slidably and pivotally mounted on the guide rod 13 for both rotation about and sliding movement along this guide rod. A combshaped divider 15 is made integral with the carriage 1 between the rear end of the pens 9 and the hammer 14. The divider 15 may preferably have the relative number of gaps between its teeth to the number of the pens 9 and is adapted to receive the hammer 14 in one of the gaps such that the hammer 14 is properly situated just behind the rear end of the particular corresponding pen 9 for actuation thereof.

Figure 5A:
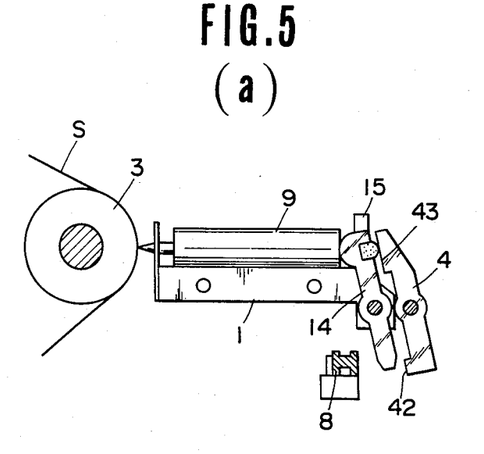
FIGS. 5(a) and 5(b) are respectively side views of the pen in its plotting and retracted positions.
Figure 5B:
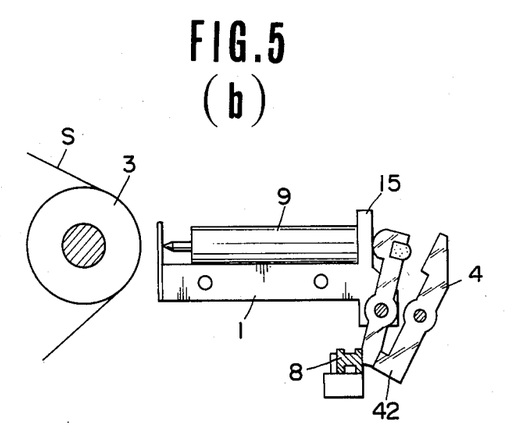
Figure 6A:
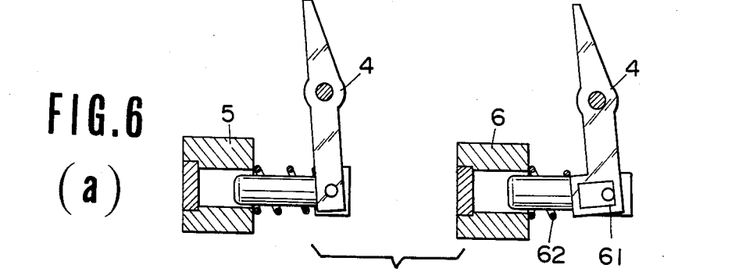
FIGS. 6(a) to 6(c) are side views of the pen releasing solenoid (the leftside diagrams) and of the pen actuating solenoid (the leftside diagrams) with the blade in their different positions, plotting, neutral and pen releasing, respectively.
Figure 6B:
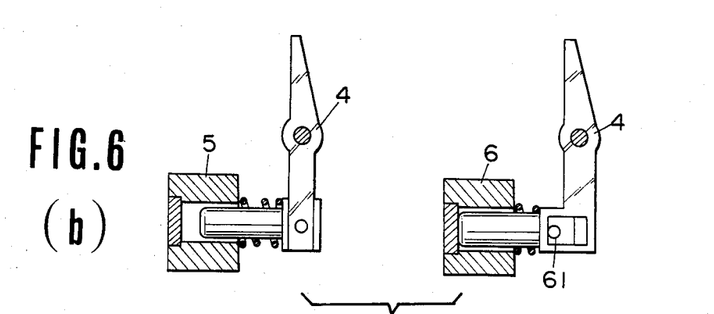
Figure 6C:
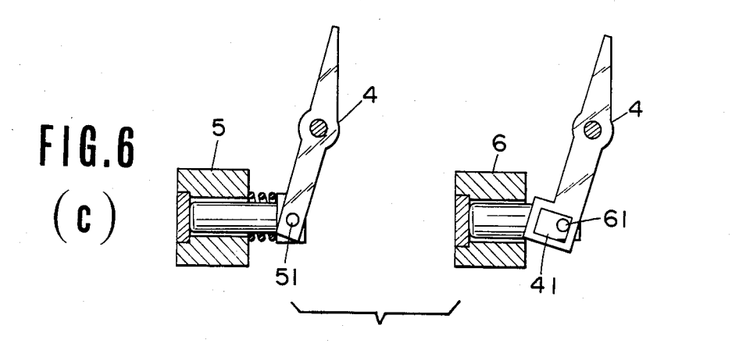

In addition, adjacent to the hammer 14 behind the carriage 1 is provided a blade member 4, which extends parallel the axis of the platen 3. Also, the blade member 4 is rotatably disposed on a horizontal axis for rocking motion and is of a dimension wider than the width of the effective plotting range, [the width defined by the right margine]. The printer body is provided on a base plate with a pen releasing solenoid 5 with a reciprocable plunger and a plunger pin 51 affixed to the plunger at one end of the base plate and with a pen actuating solenoid 6 with a reciprocable plunger and a plunger pin 61 secured to the plunger at the other end of the base plate. The blade member 4 is connected at its lower end to the pin 51 on one side and with the pin 61 on the other side, respectively. The pin 61 is inserted through an elongated hole 41 formed at the lower part of the blade member 4. Referring now to FIGS. 5(a) and 5(b), when the current pen 9 is changed to another pen, the former has first to be released from the first position where its tip is pressed into contact with the monitor paper. This is done by rotating the blade member 4 in a clockwise direction. This clockwise movement subsequently causes the thrust tongue 42, which is formed on the lower part of the blade member 4, to press the lower part of the hammer 14, thus causing it to rotate clockwise away from the divider 14. On the other hand, when the blade member 4 is rotated counter-clockwise, the press tongue 43, which is formed on the upper part of the blade member 4, is pressed against the upper part of the hammer 14, causing it to push the pen 9 into the first position. [In either of the solenoids 5 and 6, the plunger is provided with a spring 62 which normally urges the plunger out of its bore in the solenoid body. The clockwise rotation of the blade member 4 is produced by energizing both the solenoids 5 and 6 as shown in FIG. 6(c). On the other hand, when both of the solenoids 5 and 6 are de-energized, the blade member 4 rotates counter-clockwise, as shown in FIG. 6(a), so as to thereby cause the pen to move into the first position through the hammer 14. Moreover, when the solenoid 6 is energized while the solenoid 5 is de-energized, the blade member 4 takes a neutral position, as shown in FIG. 6(b).]

The numeral 7 designates a guide block which guides the hammer 14 to come just behind the reference point pen 9a when the carriage 1 starts to travel from the home position. The guide block 7 is mounted on the base plate externally of the leftmost end, which end is situated on the leftside of the home position at a distance of carriage width. Also, the guide block 7 includes an opening 71 for receiving therein the lower part of the hammer 14, an inwardly inclined cam portion 72, and an elastic member 73. The cam portion 72 serves to enable the hammer 14 to rotate away from the divider 15 as the lower end of the hammer in its movement to the left sides within the opening 71 along the inside inclined wall of the cam portion 72. The elastic member 73 prevents further movement of the hammer 14 at the exit end of the opening 71 when the carriage 1 is moving out of the guide block along with the hammer.

Referring then to FIGS. 5(a) and 5(b), the numeral 8 indicates a stopper bar which is made of an elastic material with a high frictional factor such as rubber and extends parallel with the axis of the platen 3 for a length substantially equal to the entire distance of travel of the carriage 1. The stopper bar 8 is adapted to prevent further rotation of the hammer 14 beyond a certain proper angle when it is rotated clockwise by the blade member 4, as best shown in FIG. 5(b). Since the stopper bar 8 extends far enough below the platen, excessive clockwise rotation of the hammer is prevented at any point along the path of travel of the carriage 1.

The reference code M2 designates another step motor which rotates through a reduction gearing the platen 3 in either direction (called hereinunder the complementary scanning direction as will be explained later). The step motor M2 is mounted on a fixed frame at the end opposite to the end at which the step motor M1 is installed in the printer.

With the above arrangement, operation of the plotter of this invention will be described in detail.

SETTING THE PLOTTING PEN

Figure 3:
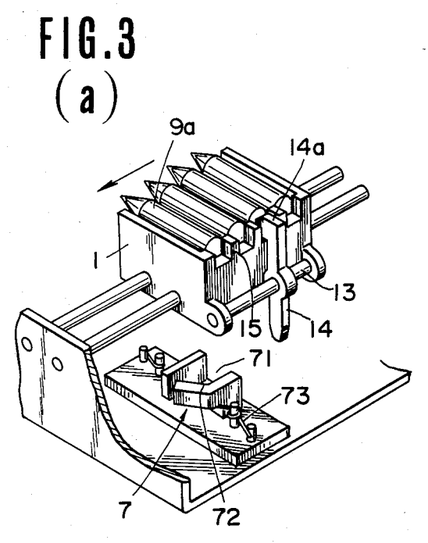
FIGS. 3(a) to 3(c) are respectively perspective views of the hammer in its different steps taken when it moves to the reference point pen.
Figure 4A:
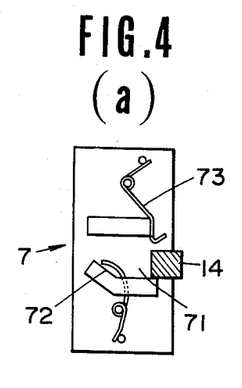
FIGS. 4(a) to 4(e) are respectively plan views of the hammer in their different positions within the guide block taken in the course of setting the reference point pen.
Figure 4B:
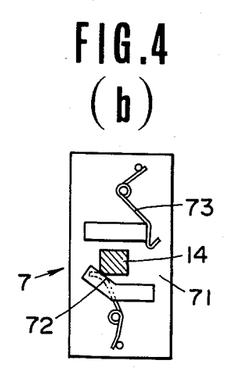

Assuming now that the printer has previously been turned off with the carriage 1 left to stay at a point within the effective plotting range, the hammer situated at the rear end of the pen 9c, as shown in FIG. 3(a), when power is turned on, the step motor M1 starts running and drives the carriage 1 to move past the home position to the left out of the effective plotting range. The hammer 14 also moves to the left with the carriage 1 and, toward the end of this movement, enters the opening 71 of the guide block 7, opening the elastic member 73, as shown in FIG. 4(a). As the hammer 14 further moves, its lower end slides along the inclined well surface of the cam portion 72, causing the hammer 14 to rotate in a clockwise direction, as shown in FIG. 4(b). This clockwise rotation causes the upper hammer end 14a of the hammer 14 to move away from the divider 15, as shown in FIG. 3(b). [At this point, the hammer 14 reaches the narrowed end of the opening 71 and comes to stop.] After the hammer 14 has stopped its movement, the carriage 1 still continues in the same direction so that the hammer 14 slides relative to the carriage until the hammer comes just behind the right end of the carriage when the carriage stops its movement.

Figure 4C:
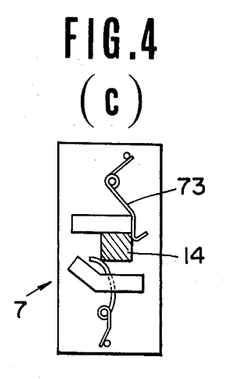
Figure 4D:
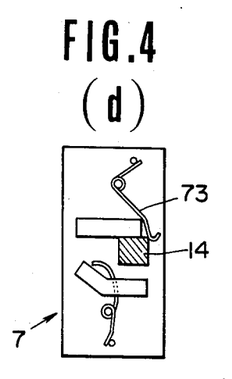
Figure 4E:
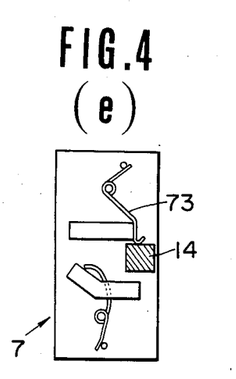

At the next stage, the step motor M1 receives a signal which drives through a wire member 19 the carriage 1 to move in the opposite direction into the effective plotting range. The hammer 14 also moves with the carriage until it is momentarily prevented from further advance, being abutted against the elastic member 73 at the exit end of the opening 71. Since the carriage 1 keeps on moving to the right past this exit end, the hammer 14 must slide along the carriage until it comes just behind the reference point pen 9a at the left end of the carriage, as shown in FIG. 3(c). When the carriage 1 further moves in the same direction, its left flanged side 12 causes the hammer 14 to force the elastic member 72 open, overcoming its elastic action, so that the hammer 14 follows the carriage 1 past the exit end of the guide block 7, as shown in FIGS. 4(c), 4(d), and 4(e). At this stage, electric current to the pen releasing solenoid 5 is disconnected while the pen actuating solenoid 6 being energized, so that the blade member 4 is rotated counterclockwise into the neutral position depicted in FIG. 6(b). This causes the hammer 14 to rotate also counter-clockwise, driving its upper hammer end 14a into the leftmost gap of the divider 15 just behind the rear end of the reference point 9a.

PLOTTING OPERATION

The plotting operation of the pen is achieved in response to an information signal which is input to the step motors M1 and M2. The information signal is also used to deenergize the pen actuating solenoid 6, causing the spring 62 around the reciprocable plunger to push on the lower part of the blade member 4 through the pin 61 so that the blade member 4 further rotates counterclockwise from the neutral position into the position of FIG. 6(a). This counter-clockwise rotation causes the hammer 14 to push the pen 9a into contact with the surface of the monitor paper S on the platen, as best shown in FIG. 5(a) and FIG. 6(a). With the pen 9a in this position, the step motor M1 moves the carriage 1 in a linear direction (i.e., the main scanning direction) through the wire member 19, enabling the pen to plot the horizontal component of the image or character to be represented on the paper while the step motor M2 drives the platen 3 in either direction (i.e., the complementary scanning direction) through the reduction gearing, thus enabling the pen to plot the vertical component of the representation, in accordance with an information signal, so that the whole image or character is reproduced on the paper by the tip of the pen 9a.

CHANGING THE PEN

The procedure of changing the current to another pen during plotting operation will be described.

When selecting a particular pen, the pen releasing solenoid 5 must first be energized by a signal commanding a pen release action which is output through any conventional control circuit. Energization of the solenoid 5 allows its reciprocable plunger to pull through the pin 51 the blade member 4 which is rotated clockwise. This clockwise rotation causes the thrust tongue 42 of the blade member 4 to push the lower part of the hammer 14, causing the latter to rotate clockwise. This allows the upper hammer end 14a to move away from the divider 15. The lower end of the hammer 14 rests on the stopper bar 8 so that the former is held in a fixed position. It is important to note that, during this operation, the pen actuating solenoid 6 is in the energized state so that the pin 61 held at the solenoid side corner within the elongate hole 41, which is formed at the lower part of the blade, as shown in the righthand diagram of FIG. 6(c), without causing intervention with the clockwise rotation of the blade member 4.

With the hammer 14 in this fixed position, the carriage 1 is moved in stepwise motions in the required direction until the stationary hammer 14 arrives at the rear end of the selected pen. This is done by supplying the step motor M1 with the relative number of pulses to the distance between the previous pen and the newly selected pen divided by the distance that is moved by the carriage in a single step motion. For example, if the distance between the pens is 5.4 mm and the carriage moves 0.2 mm each step, the number of pulses fed to the step motor M1 is 27 (5.4 divided by 0.2).

In this way, relative movement places the stationary hammer 14 at a desired pen 9 on the moving carriage 1.

After the desired pen 9 has been selected, deenergization of the pen releasing solenoid 5 rotates the blade member 4 back into a neutral position, causing the hammer 14 to rotate counter-clockwise to enter the divider 14, with the upper hammer end 14a situated opposite the rear end of the selected pen 9.

Figure 7:
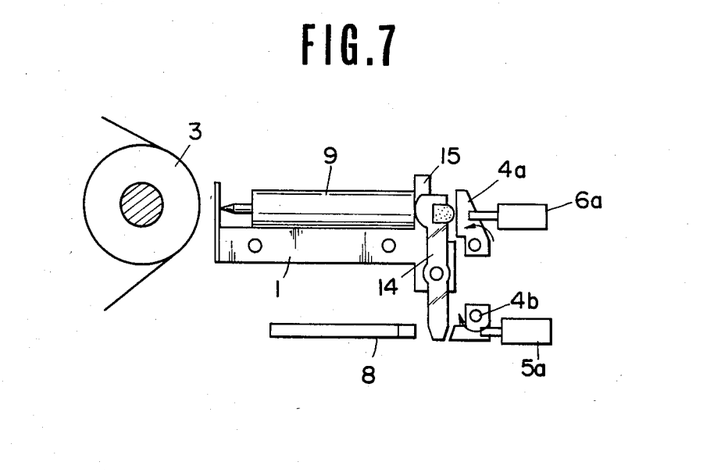
FIG. 7 is a schematic side view of a second embodiment of this invention.

FIG. 7 is another embodiment according to the present invention.

In the drawing, the blade member 4 of the previous embodiment is divided into separate parts, upper thrust bar 4a and lowerthrust bar 4b for open actuating and pen releasing operations, respectively. The upper thrust bar 4a is of a dimension wider than the width of the effective plotting range and is pivotally disposed on a horizontal shaft for free rotation. The bar 4a also extends horizontally parallel with the axis of the platen 3 at about the same height as the upper part of the hammer 14 so that the bar 4a, upon rotation counter-clockwise (in the drawing), comes into contact with the upper rear face of the hammer 14. Connected to the bar 4a is a pen actuating solenoid 6a having a reciprocable plunger which pushes the bar 4a which in turn causes the hammer 14 to rotate in a counter-clockwise direction, allowing its upper front to push the pen toward the platen 3. Similarly, the lower thrust bar 4b is of a dimension wider than the width of the effective plotting range and is also pivotally disposed on a fixed horizontal shaft for free rotation. Moreover, the bar 4b extends horizontally with the upper thrust bar 4a at about the same height as the lower part of the hammer 14 so that the bar 4b, upon rotation clockwise (in the drawing), comes into contact with the lower rear face of the hammer 14. Connected also to the bar 4b is a pen releasing solenoid 5a having a reciprocable plunger which pushes the bar 4b which in turn causes the hammer 14 to rotate in a clockwise direction, withdrawing its upper part away from the divider 15. The hammer has its lower end rest on the stopper bar 8.

Alternatively, each of the thrust bars 4a, 4b may be slidably disposed, instead of mounted pivotally on a horizontal axis, for free linear movement toward the corresponding end portion of the hammer 14.

Figure 8:
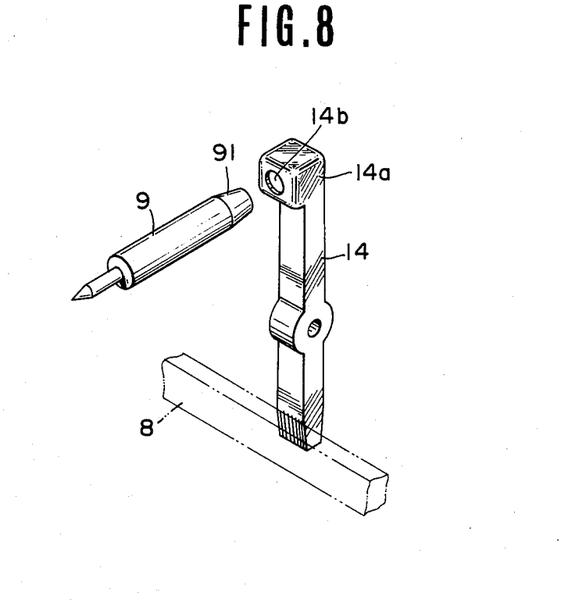
FIG. 8 is a perspective view of a modified version of the hammer.

FIG. 8 shows a third embodiment of the present invention. The hammer 14 is formed with a recess 14b in the front face of the upper hammer portion 14a, facing the pens. Each of the plural pens on the carriage 1 is tapered at the rear end into a truncated cone 91 sized to fit in the recess 14b. Due to this mating relationship of the recess 14b with the trunctated cone 91 of the hammer 14, proper positioning of the hammer 14 relative to the individual pen 9 is directly obtained, without use of the divider 15.

Also, in this embodiment, the lower surface of the hammer 14 which faces the stopper bar 8 is formed with fine vertical grooves so that, if this stopper bar 8 is made of a material with reduced frictional factor, this lower surface of the hammer would provide for sufficient frictional force in contact with the stopper bar 8.

We claim:

1. A pen type multi-color recording device of the type having a carriage movably disposed for linear movement in a main scanning direction and carrying a row of recording pens in which a pusher means is actuated to bring the selected pen at the proper slit of a comb-shaped divider into pressure contact with a recording medium for recording, comprising:
    (a) actuator means movably disposed for driving said pusher means between a first position where it is moved away from said divider and a second position where it is inserted into one of the slits formed in said divider, said actuator means mounted on a fixed member to extend parallel with said pusher means and having a dimension wider than the effective plotting range;
    (b) drive means for moving said actuator means in response to a pen release signal and a pen actuation signal; and
    (c) stopper means mounted on said fixed member for temporarily arresting said pusher means at said first position.

2. A recording device as set forth in claim 1, wherein said actuator means is a one-piece blade member having a width corresponding to the width of said pusher means, said blade member being pivotally disposed about a horizontal axis that extends in the middle of said blade member.

3. A recording device as set forth in claim 1, wherein said drive means comprises two solenoids each having a reciprocable plunger for actuating said actuator means for pen releasing and pen actuating operations, respectively, said solenoids being situated at opposite longitudinal ends of said actuator means.

4. A recording device as set forth in claim 1, wherein said actoator means comprises a pair of separate thrust members, one being adapted for actuating said pusher means for a pen releasing operation while the other being adapted for actuating said pusher means for a pen actuating operation.

* * * * *